US008465365B2

(12) United States Patent
Henderson

(10) Patent No.: US 8,465,365 B2
(45) Date of Patent: Jun. 18, 2013

(54) INTERACTIVE MULTI-SCREEN DISPLAY

(75) Inventor: Byron M. Henderson, New York, NY (US)

(73) Assignee: Game Changer, LLC, New York, NY (US)

(*) Notice: Subject to any disclaimer, the term of this patent is extended or adjusted under 35 U.S.C. 154(b) by 763 days.

(21) Appl. No.: 12/134,140

(22) Filed: Jun. 5, 2008

(65) Prior Publication Data

US 2008/0305870 A1 Dec. 11, 2008

Related U.S. Application Data

(60) Provisional application No. 60/942,052, filed on Jun. 5, 2007, provisional application No. 61/022,136, filed on Jan. 18, 2008.

(51) Int. Cl.
| A63F 9/24 | (2006.01) |
| H04N 7/16 | (2006.01) |
| G09G 5/00 | (2006.01) |

(52) U.S. Cl.
USPC .............. 463/31; 345/1.1; 725/141; 725/149

(58) Field of Classification Search
USPC ....... 725/141, 149; 345/2.2, 625–628; 463/31
See application file for complete search history.

(56) References Cited

U.S. PATENT DOCUMENTS

| 5,305,181 A | 4/1994 | Schultz |
| 5,618,045 A | 4/1997 | Kagan et al. |
| 5,671,292 A | 9/1997 | Lee et al. |
| RE35,786 E | 5/1998 | Ohara |
| 6,327,002 B1 | 12/2001 | Rinaldi et al. |
| 6,473,023 B1 | 10/2002 | Takagi et al. |
| 6,524,188 B2 | 2/2003 | Wang |
| 6,540,614 B1 * | 4/2003 | Nishino et al. .................. 463/40 |
| 6,754,069 B2 | 6/2004 | Harada |
| 6,773,349 B2 | 8/2004 | Hussaini et al. |
| 6,853,293 B2 | 2/2005 | Swartz et al. |
| 6,921,336 B1 | 7/2005 | Best |
| D508,088 S | 8/2005 | Hussaini et al. |
| 6,923,722 B2 | 8/2005 | Yamada et al. |
| 6,966,837 B1 | 11/2005 | Best |
| 6,970,157 B2 | 11/2005 | Siddeeq |
| 7,034,776 B1 * | 4/2006 | Love .............................. 345/2.1 |
| 7,041,032 B1 | 5/2006 | Calvano |

(Continued)

FOREIGN PATENT DOCUMENTS

JP 011316635 A 2/1999

*Primary Examiner* — Dmitry Suhol
*Assistant Examiner* — Carl V Larsen
(74) *Attorney, Agent, or Firm* — Ward & Zinna, LLC

(57) ABSTRACT

For a playing experience in a computer game that more accurately captures the experience of professional football or another sport, it would be advantageous to be able to hide from an opponent a selected player formation and play selection until the play actually begins. Similarly, in other computer games such as war games and role-playing games, it is desirable to be able to hide from other players certain properties—e.g., equipment, disposition of forces, etc.—held by each player while making this information available to the player holding these properties. In the present invention, a signal processor is inserted in the link between the game console and the television set and auxiliary displays are provided that are visible only to individual players. The signal processor detects certain frames containing information that should not be displayed to all players, removes that information from the signal to the television set and displays it instead on the appropriate auxiliary display.

15 Claims, 12 Drawing Sheets

U.S. PATENT DOCUMENTS

| | | |
|---|---|---|
| 7,098,868 B2 * | 8/2006 | Love et al. .................... 345/1.1 |
| 7,115,031 B2 | 10/2006 | Miyamoto et al. |
| 2002/0165028 A1 * | 11/2002 | Miyamoto et al. ............. 463/46 |
| 2003/0028873 A1 * | 2/2003 | Lemmons ....................... 725/36 |
| 2003/0030595 A1 | 2/2003 | Radley-Smith |
| 2003/0072560 A1 * | 4/2003 | Janevski ........................ 386/95 |
| 2003/0220142 A1 | 11/2003 | Siegel |
| 2004/0201544 A1 * | 10/2004 | Love et al. .................... 345/1.1 |
| 2005/0043095 A1 | 2/2005 | Larson |
| 2005/0164789 A1 * | 7/2005 | Nakamura et al. ............. 463/36 |
| 2005/0176502 A1 | 8/2005 | Nishimura et al. |
| 2005/0255912 A1 * | 11/2005 | Love et al. ..................... 463/30 |
| 2006/0003841 A1 | 1/2006 | Kobayashi et al. |
| 2006/0068917 A1 | 3/2006 | Snoddy et al. |
| 2006/0113338 A1 | 6/2006 | Harrison, Jr. |
| 2006/0197835 A1 | 9/2006 | Anderson et al. |
| 2006/0209218 A1 | 9/2006 | Lee et al. |
| 2007/0004519 A1 | 1/2007 | Swart et al. |
| 2007/0010335 A1 | 1/2007 | Al-Sabah |
| 2009/0174728 A1 * | 7/2009 | Ferrer et al. ................. 345/619 |

\* cited by examiner

INTERACTIVE MULTI-SCREEN DISPLAY

CROSS-REFERENCE TO RELATED APPLICATIONS

This application claims benefit of provisional application Ser. No. 60/942,052 filed Jun. 5, 2007 and Ser. No. 61/022,136 filed Jan. 18, 2008, both of which are hereby incorporated by reference in their entirety.

FIELD OF THE INVENTION

This relates to interactive displays. It is particularly useful in computer gaming and will be described in that context.

BACKGROUND OF THE INVENTION

In a conventional computer game, a game console such as a Playstation, Xbox, Gamecube or Wii is connected to a television set and individual player controllers are connected to the game console. In this arrangement, each player sees everything displayed on the television screen. In many multi-player computer games, however, it may be desirable to limit the display of certain information to one of the players so that his opponent(s) cannot see that information. For example, in various sports games such as Madden '07 and similar games, the offensive and defensive players have the opportunity to select both their team's formation and a particular play. In commercially available versions of these games, this is done with one player knowing the other player's selected formation and which plays are available for selection since they are displayed on the screen in front of him.

FIGS. 13 and 14 depict the general format of the offensive and defensive player formation selection screens 1300 and play selection screens 1400 in Madden '07. Formation selection screen 1300 comprises upper and lower formation selection boxes 1310 and 1320 and scoreboard 1390 in between. Play selection screen 1400 is similar and comprises upper and lower play selection boxes 1410 and 1420 and scoreboard 1490 inbetween. In FIG. 13, the defensive player formations are shown at the top in box 1310 and the offensive player formations are shown at the bottom in box 1320. Scoreboard 1390 displays logos 1330 or other indicia representative of the teams (in this case, Cowboys and Eagles), score boxes 1340, a play clock 1350, a game clock 1360, a possession dot 1370 indicating which team has the ball, and a yard marker 1380. Each player selects one of the formations displayed in boxes 1310 or 1320 by scrolling through a series of possible formations and clicking a button or operating a similar selection mechanism on his controller when he reaches the desired formation. FIG. 13 depicts the display for selection of a 3-4 defensive formation and a singleback offensive formation.

When the formation is selected, multiple plays from that formation are then presented to the player and the player then selects one of these plays to run. The defensive player's play selections are shown at the top of FIG. 14 in box 1410 and the offensive player's play selections are shown at the bottom in box 1420. Scoreboard 1490 contains the same elements as scoreboard 1390 with the element numbers incremented by 100. FIG. 14 depicts the display for selection of three plays from the 3-4 defensive formation and three plays from the singleback offensive formation. The play clock 1450 specifies the offensive player's time to select a play. If he fails to select a play in the specified time, a delay of game penalty results. The defensive player has an additional 10 seconds after the offensive player selects a play to select a defensive play. The defensive player's time to make a selection is also displayed by play clock 1450. If the defensive player fails to select a defensive play in 10 seconds, the most recent defensive play is repeated.

SUMMARY OF THE PRESENT INVENTION

For a playing experience that more accurately captures the experience of professional football or another sport, it would be advantageous to be able to hide from an opponent a selected player formation and play selection until the play actually begins. Similarly, in other computer games such as war games and role-playing games, it is desirable to be able to hide from other players certain properties—e.g., equipment, disposition of forces, etc.—held by each player while making this information available to the player holding these properties. At the same time, any secrecy that is achieved should not detract from the playability of the game and should make efficient use of display screen resources.

In the present invention, a signal processor is inserted in the link between the game console and the television set and auxiliary displays are provided that are visible only to individual players. The signal processor detects certain frames containing information that should not be displayed to all players, removes that information from the signal to the television and displays it instead on the appropriate auxiliary display.

BRIEF DESCRIPTION OF THE DRAWINGS

These and other objects, features and advantages of my invention will be more readily apparent from the following Detailed Description in which.

DETAILED DESCRIPTION

In the present invention, a signal processor is inserted in the link between the game console and the television set; and auxiliary displays are provided that are visible only to individual players. Advantageously, each auxiliary display is mounted on a player's controller or on his forearm. The auxiliary displays can also be placed on any flat surface such as a table or a floor or rested in the player's lap.

Figure 1:
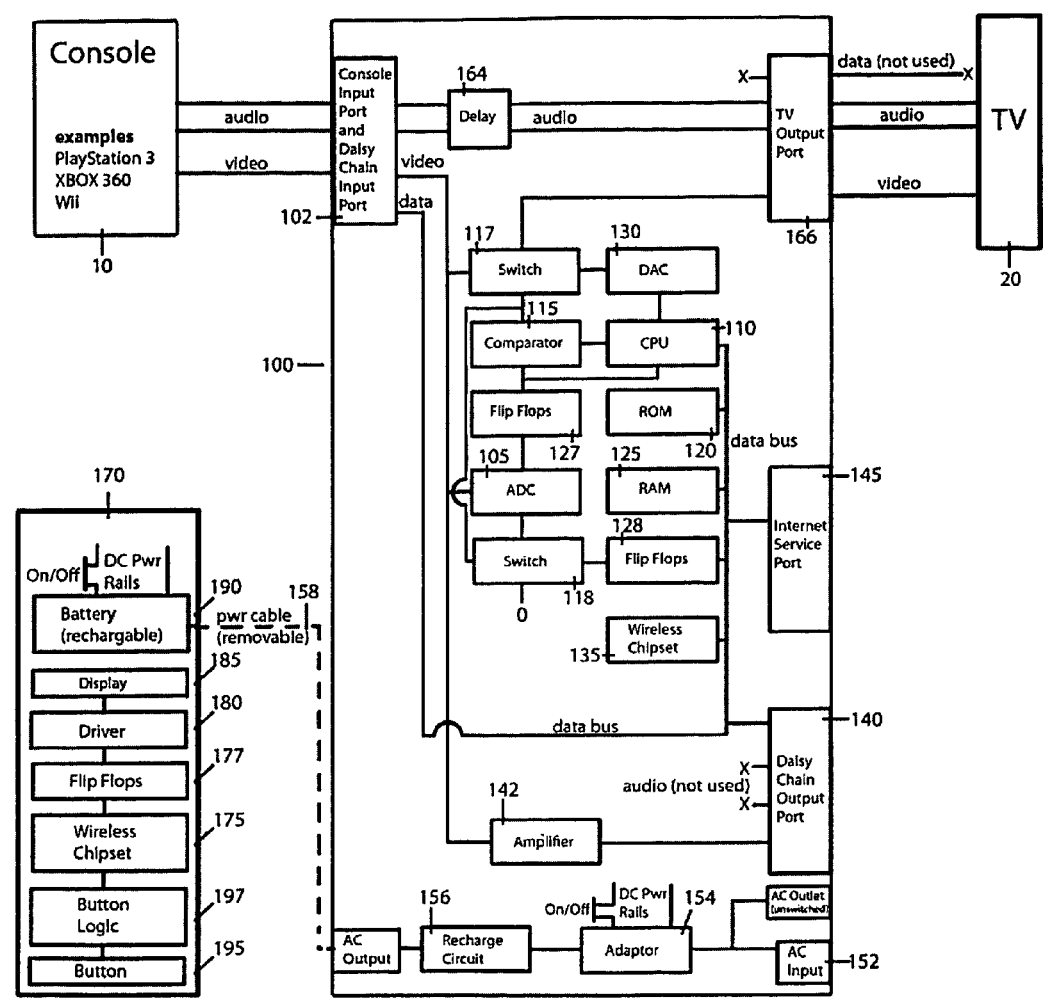
FIG. 1 is a block diagram of a first illustrative embodiment of circuitry of the invention.

FIG. 1 is a schematic illustration of a signal processor 100 and an auxiliary display 170 of a first illustrative embodiment of circuitry of the invention. Preferably, each player has his own auxiliary display 170 and, in one embodiment of the invention, each auxiliary display is connected to its own signal processor 100. The signal processors 100 are daisy chained together as described below.

Signal processor 100 receives the television signal from a game console 10, detects certain frames that are to be modified in accordance with the invention, sends a first portion of such frames to auxiliary display 170 and sends the remainder on to television 20. In the case of Madden '07 and similar games, the frames that are modified are the formation selection screens and the play selection screens. In other contexts, the frames that are modified are those containing information to be observed by only a limited number of people. Typically, the video signal from the game console is an analog NTSC video signal. For processing such a signal, signal processor 100 comprises a signal port 102, an analog to digital converter (ADC) 105, a central processing unit (CPU) 110, a comparator 115 and switches 117, 118, memory such as ROM 120 and RAM 125, flip-flops 127, 128, a digital to analog converter (DAC) 130, and a communications interface 135 such as a wireless chipset. While a wireless connection is preferred between signal processor 100 and auxiliary display 170, a wired connection can be used.

Signal processor 100 also includes a bidirectional daisy chain port 140 to which the signal input 102 of another signal processor 100 (not shown) may be connected, an Internet service port 145 and a power supply. Separate signal processors 100 (and auxiliary displays 170) for each player are daisy chained together by connecting the port 102 of a downstream signal processor to daisy chain port 140 of the upstream signal processor. An amplifier 142 amplifies the video signal supplied to daisy chain port 140 and the downstream processor. Certain status signals are provided by the downstream processor to the upstream processor. The status signals are used in determining the extent of the modification made in the video signals sent to the television set. The power supply preferably includes an alternating current input 152 with an adapter 154 for producing DC power for the signal processor. Advantageously, the power supply can also recharge auxiliary display 170 through a recharge circuit 156 and removable power cable 158.

Auxiliary display 170 comprises a communication interface 175 such as a wireless chipset, flip-flops 177, a display driver 180, a display 185 such as a liquid crystal display (LCD) or liquid crystal on silicon (LCOS), a power supply 190 such as a battery and a selection button 195 and associated logic 197.

In operation, audio signals from the game console are received at port 102, delayed by delay circuit 164 an amount equal to any processing delay encountered by the video signal and forwarded on to the television set from output 166. Video signals are received at port 102 and provided to switch 117, ADC 105 and amplifier 142. The signal provided to the amplifier 142 is output through port 140 to another signal processor if one is connected to the output port. The signal provided to ADC 105 is converted to a digital signal, stored temporarily in flip-flops 127 and compared by comparator 115 with a digital signature stored in ROM 120. Illustratively, the digital signature used in this comparison is a generic representation of formation selection screen 1300 and play selection screen 1400 and is referred to below as a play call screen signature.

If the digital signature is not detected in the comparison, the analog video signal received at the video input 102 is passed through switch 117 without any alteration and provided to output port 166 and to television set 20. At the same time, a null output (all zeroes) is provided by switch 118 to flip-flops 128 and is transmitted by wireless chipset 135 to auxiliary display 170. As a result, nothing is displayed on the auxiliary display. If the digital signature is detected in the comparison, switch 117 is operated so that no more than a portion of the video signal received at input 102 is provided to output port 166. In particular, in the case of Madden '07, if the team associated with processor 100 has the ball, the offensive player formation selection and play selection boxes are not forwarded to output port 166. Rather, switch 118 is operated so that at least the digital version of the offensive player formation selection and play selection boxes is provided to flip-flops 128 and is transmitted by wireless chipset 135 to auxiliary display 170. Whether the defensive player formation selection and play selection boxes are displayed depends on a signal received from the downstream processor. Conversely, if the team associated with processor 100 does not have the ball, the defensive player formation selection and play selection boxes are not forwarded to output port 166; and switch 118 is operated so that at least the digital version of the defensive player formation selection and play selection boxes is provided to flip-flops 128 and transmitted by wireless chip set 135 to auxiliary display 170. Similarly, whether the offensive player formation selection and play selection boxes are displayed depends on a signal received from the downstream processor.

In like fashion, video signals provided through port 140 of a first (or main) signal processor to port 102 of a second signal processor will be processed by the second signal processor. Thus, the second signal processor (and any additional downstream daisy chained processor) will compare the same video signals as the first signal processor using a digital signature stored in its ROM 120. If the digital signature is detected in the comparison, a flag is set and forwarded back to the first (or main) signal processor and a portion of the video signal is provided to the auxiliary display associated with that second signal processor. In particular, if the team associated with the second signal processor has the ball, at least the digital version of the offensive player formation selection and play selection boxes is provided to flip-flops 128 and is transmitted by wireless chipset 135 of the second signal processor to the second auxiliary display. Conversely, if the team associated with the second signal processor does not have the ball, at least the digital version of the defensive player formation selection and play selection boxes is provided to flip-flops 128 and is transmitted by wireless chipset 135 of the second signal processor to the second auxiliary display. The flag that is forwarded causes the first (or main) processor to blank from the screen on television 20 the information on the second auxiliary display.

Figure 2A:
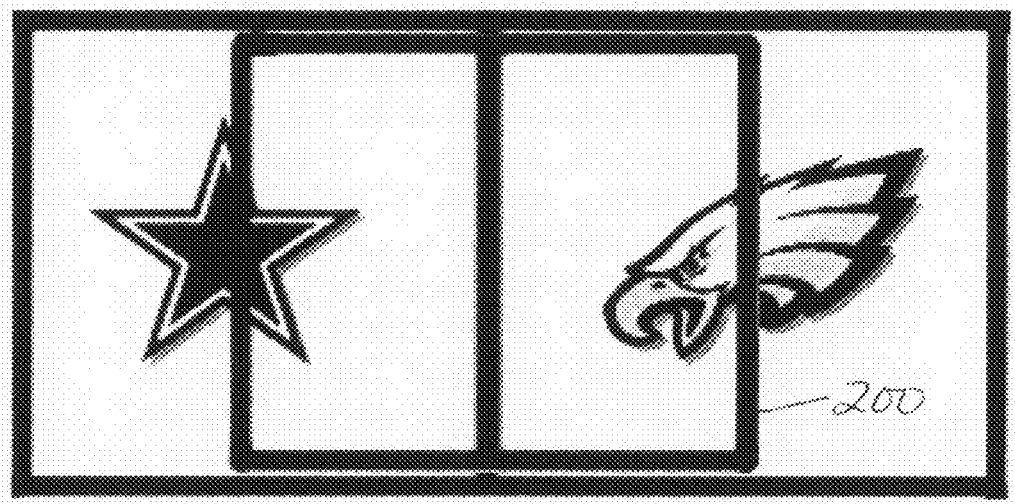
FIGS. 2A, 2B and 3 through 6 are illustrations of team choose screens, formation selection screens and play selection screens of illustrative embodiments of the invention.

Specific teams are associated with a specific processor and auxiliary display at the beginning of play. The teams may be identified by logos, names or other unique identifiers or simply "HOME and AWAY." FIG. 2A depicts a team choose screen as displayed on television 20 with team logos displayed in boxes on the left and right sides of the screen. Square box 200 in FIG. 2A is a selection box that is shifted left or right by clicking on a button on the auxiliary display. A team is selected by moving the box so that it is over the logo and double clicking. Once a team is selected, that auxiliary display and the processor it communicates with are associated with that team; and the player using that processor and auxiliary display is on the offensive or defensive depending on which team has the ball as specified by the location of possession dots 1370, 1470 on scoreboards 1390, 1490, respectively.

Figure 2B:
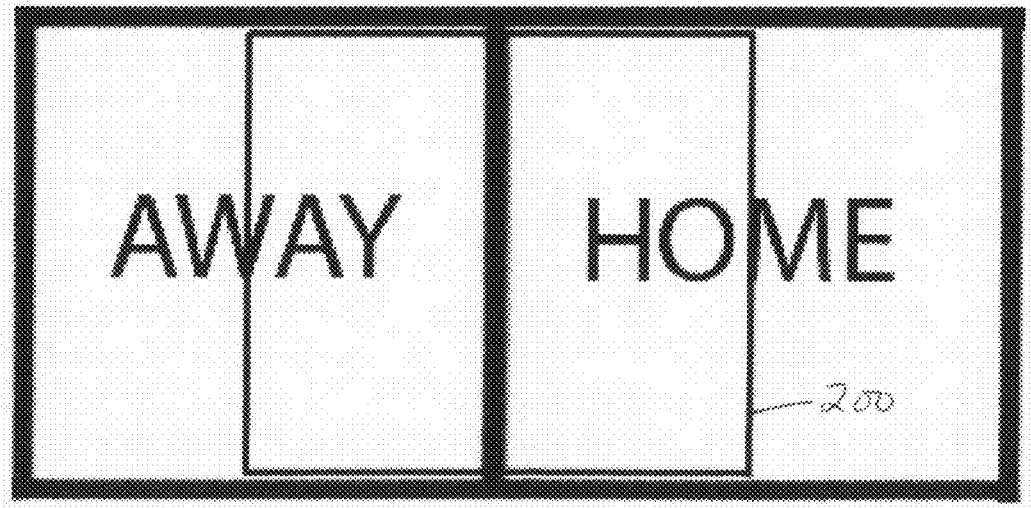

FIG. 2B depicts a team choose screen with the identification "HOME" and "AWAY" displayed in boxes. Square box 200B in FIG. 2B is a selection box that is shifted left or right by clicking on a button on the auxiliary display. A team is selected by moving box 200B so that it is over "HOME" or "AWAY" and double clicking. Again, once a team is selected, that auxiliary display and the processor it communicates with are associated with that team; and the player using that processor and auxiliary display is on the offensive or defensive depending on which team has the ball as specified by the location of the possession dot on the scoreboard.

Figure 3:
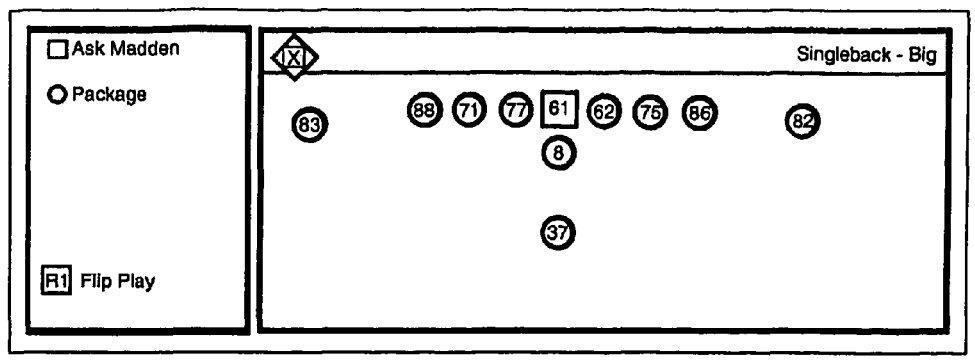
Figure 4:
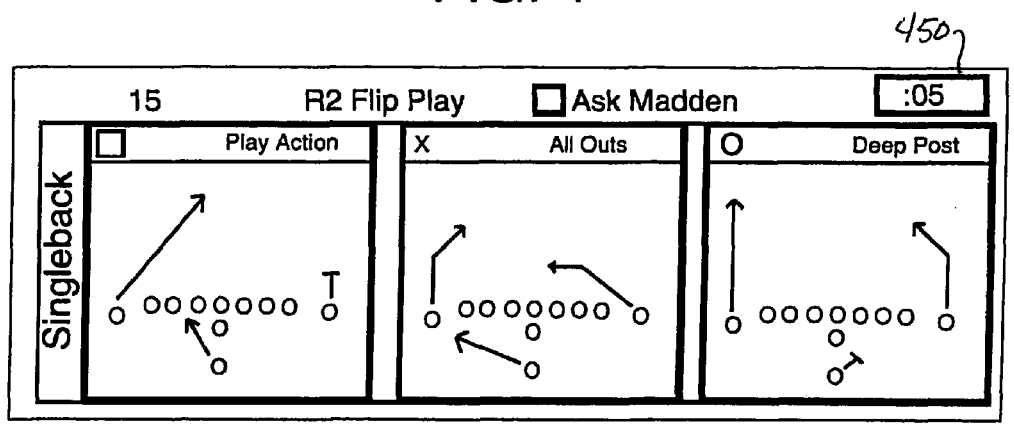
Figure 5:
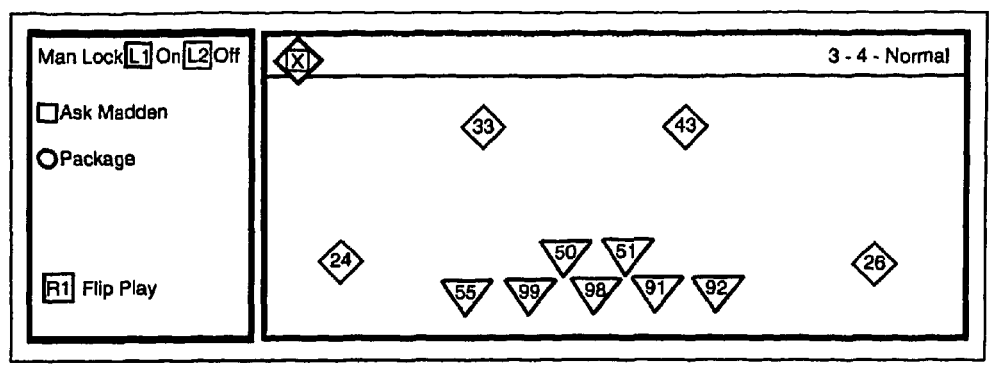
Figure 6:
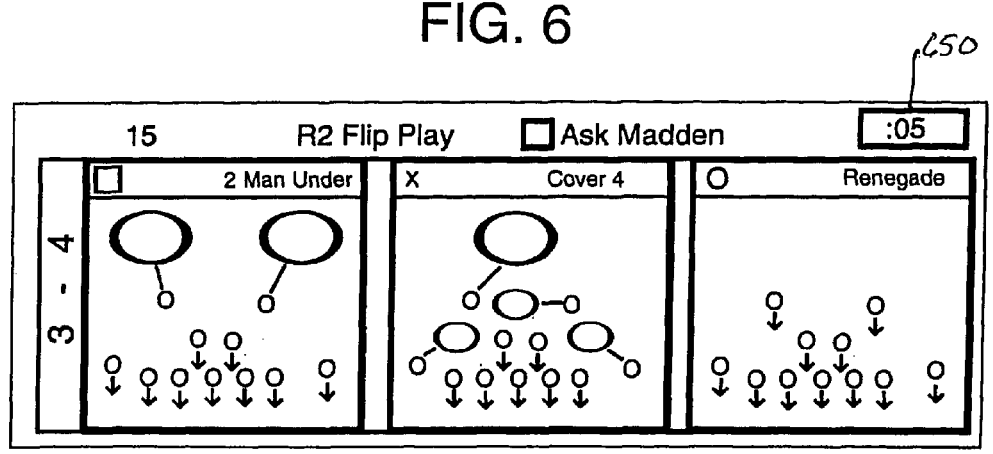

FIGS. 3 and 4 depict the offensive player's formation selection and play selection boxes that are presented on auxiliary display 170; and FIGS. 5 and 6 depict the defensive player's formation selection and play selection boxes that are presented on auxiliary display 170. Each player scrolls through a series of possible player formations until he selects one; and then he selects one of several possible plays from that formation. FIGS. 3 and 5 depict the singleback offensive formation and the 3-4 defensive formation, respectively, at the time of their selection. FIGS. 4 and 6 depict three plays that may be selected from the singleback offensive formation and three plays that may be selected from the 3-4 defensive formation. This is the formation selection and play selection information obscured from the screen of television 20. A play clock 450, 650 is in the upper right corner of FIGS. 4 and 6.

Figure 7:
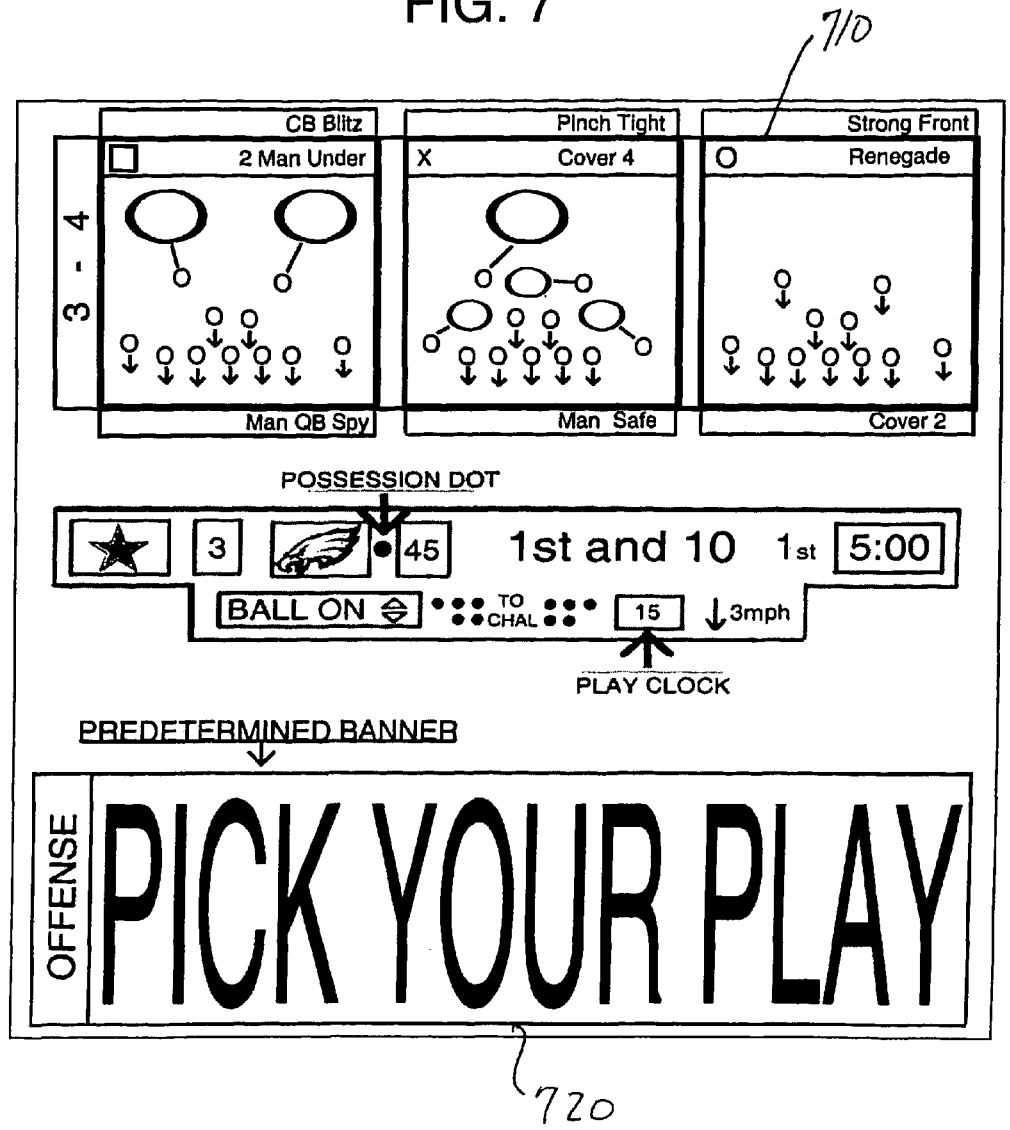
FIGS. 7 and 8 are illustrations of alternative television play call screens of an illustrative embodiment of the invention.
Figure 8:
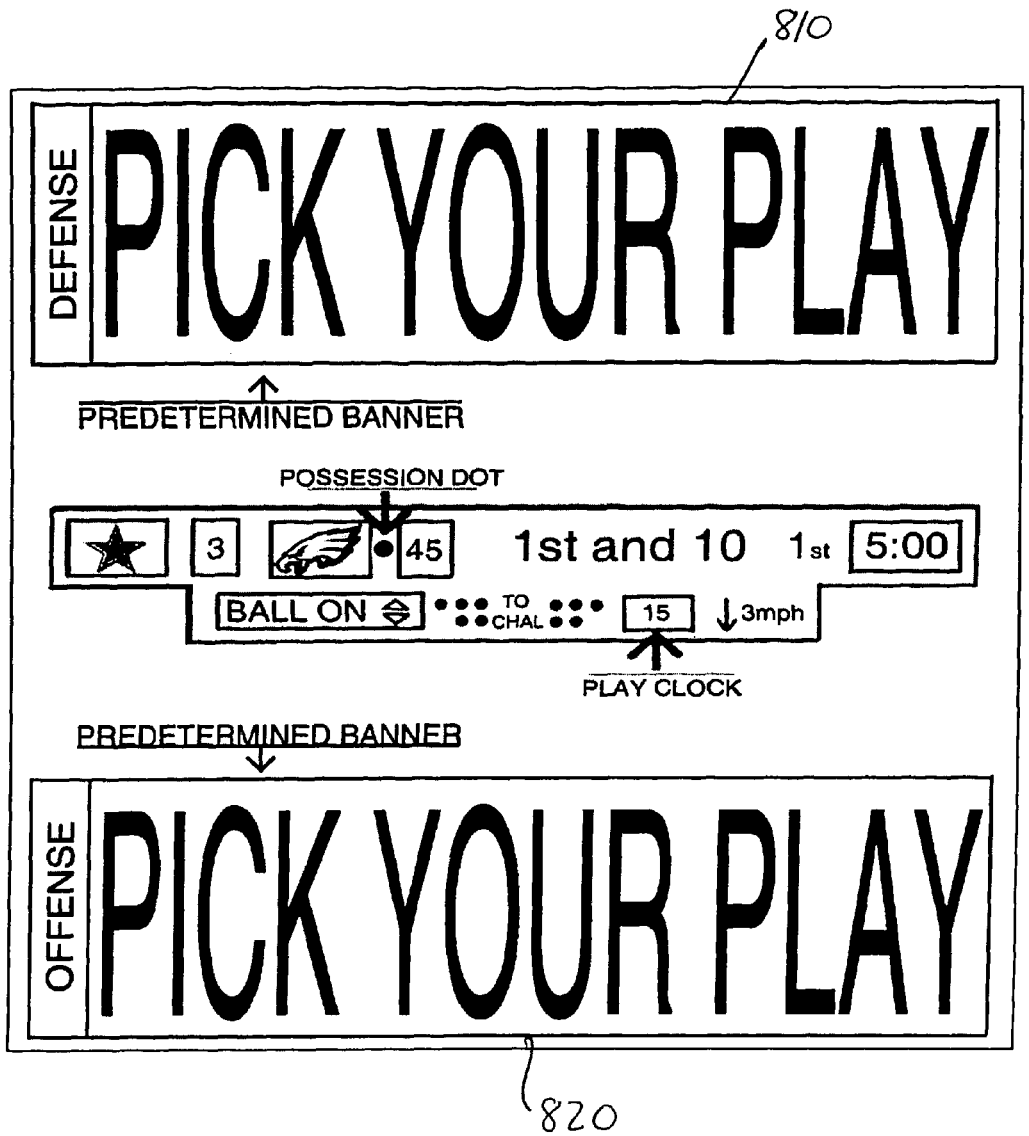
Figure 13:
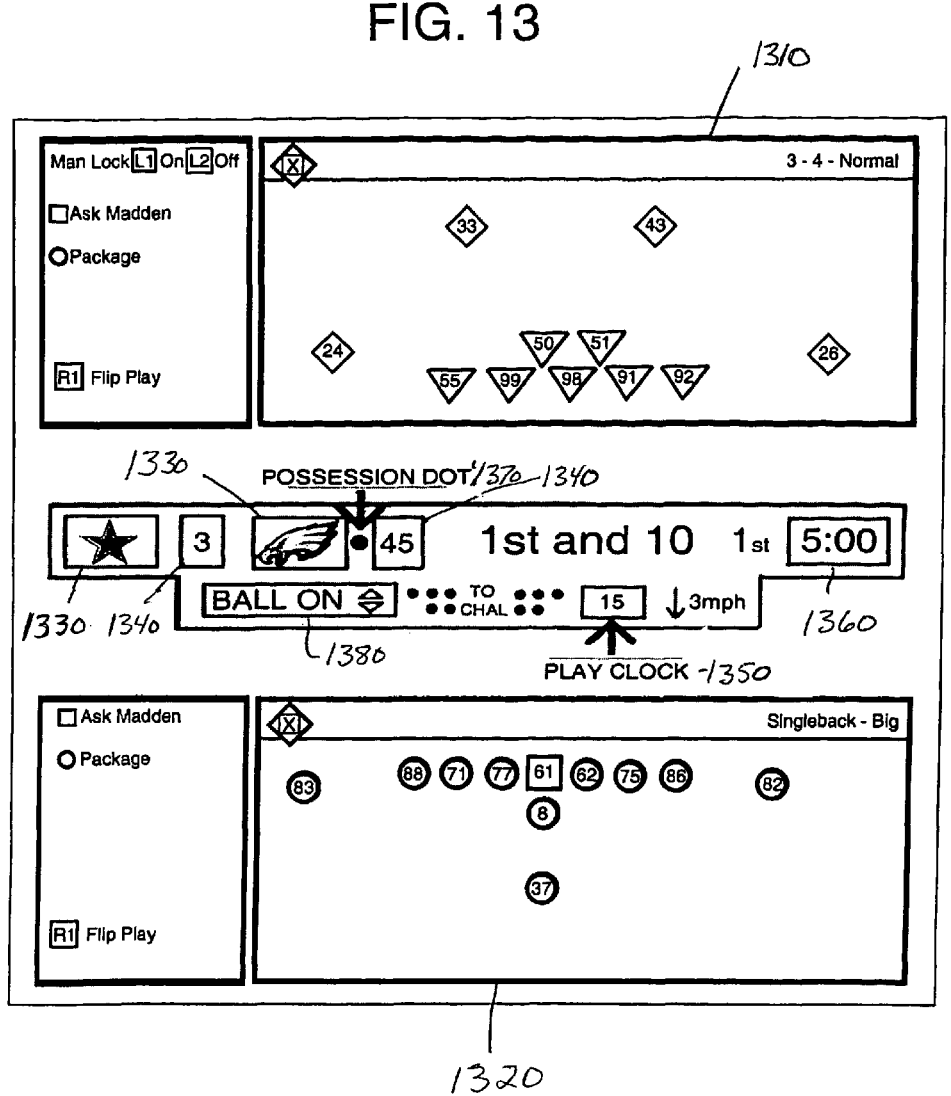
FIGS. 13 and 14 are illustrations of television play call screens of the prior art.
Figure 14:
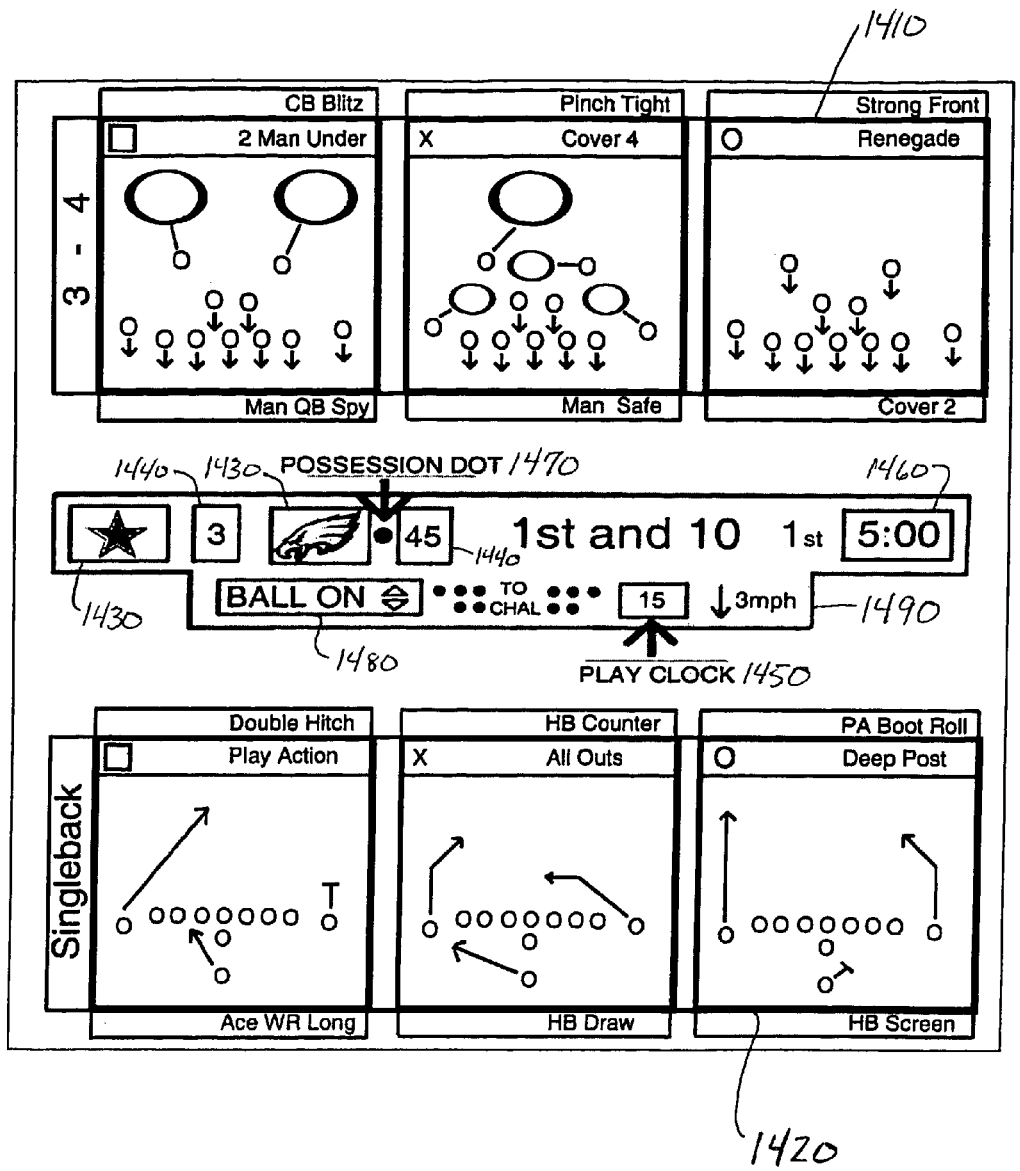

FIGS. 7 and 8 depict alternative play call screens 700, 800 that are displayed on the television screen in accordance with the invention. In contrast to the prior art displays of FIGS. 13 and 14, in FIG. 7 the offensive player's formation selection and play selection have been obscured in box 720. In like fashion, the defensive player's formation selection and play selection can be obscured in box 710. In FIG. 8, both players' formation selections and play selections have been obscured in boxes 810 and 820. As a result, one or both players must select his formation and play without information about his opponent's formation and play.

Figure 9:
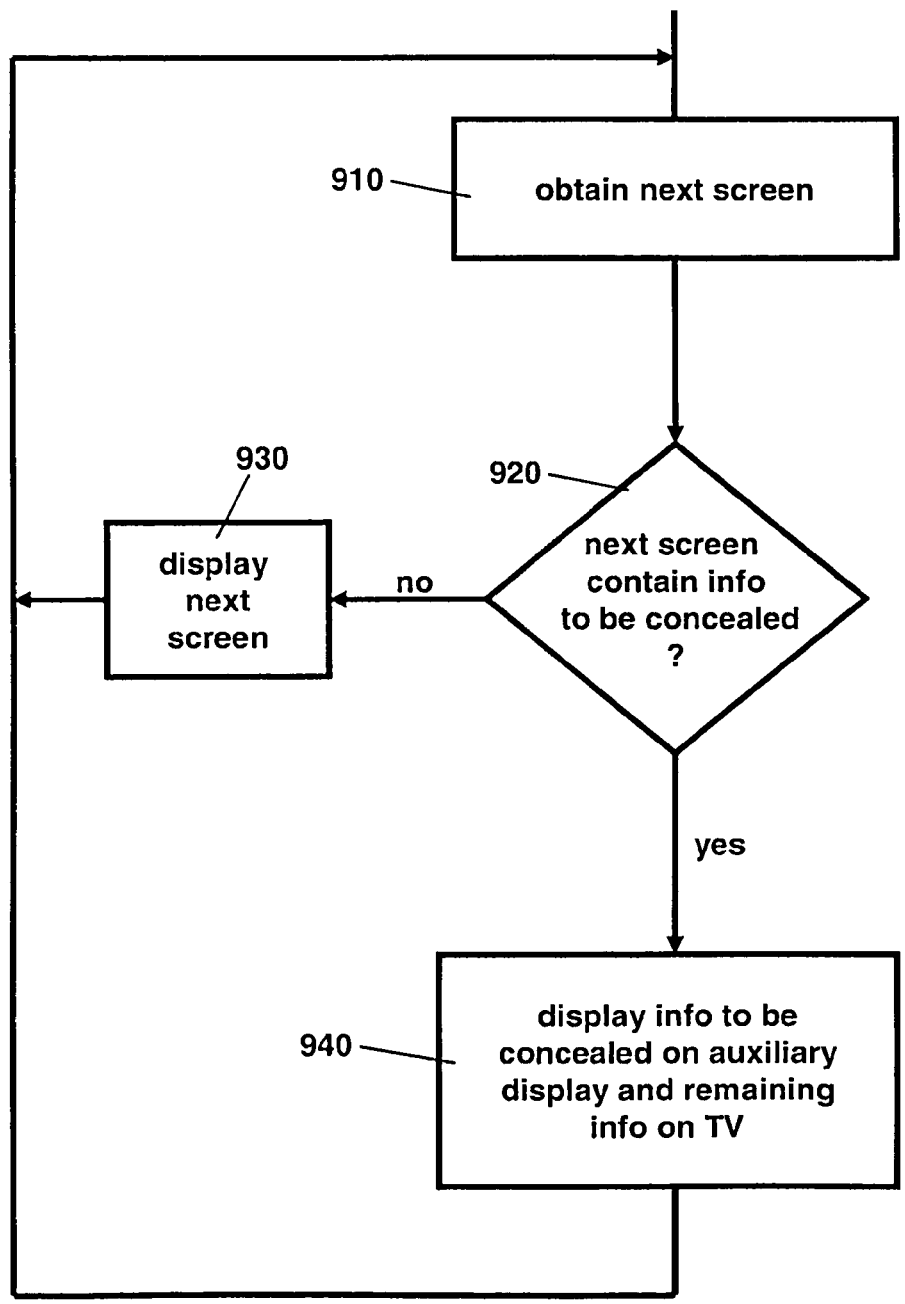
FIGS. 9 and 10 are flowcharts depicting operation of illustrative embodiments of a process of the invention.

FIG. 9 is a flowchart depicting the overall operation of one embodiment of the invention. At step 910, the next screen of the video signal is obtained. At step 920, the next screen is tested to determine if it contains information that is to be concealed. Typically, this test is performed by comparing the screen with a signature that identifies screens containing information that is to be concealed. If such information is not present in the next screen, the next screen is displayed to all at step 930. Otherwise, at step 940 at least the information that is to be concealed is displayed on the auxiliary display 170 and any remaining information is displayed to all.

Figure 10:
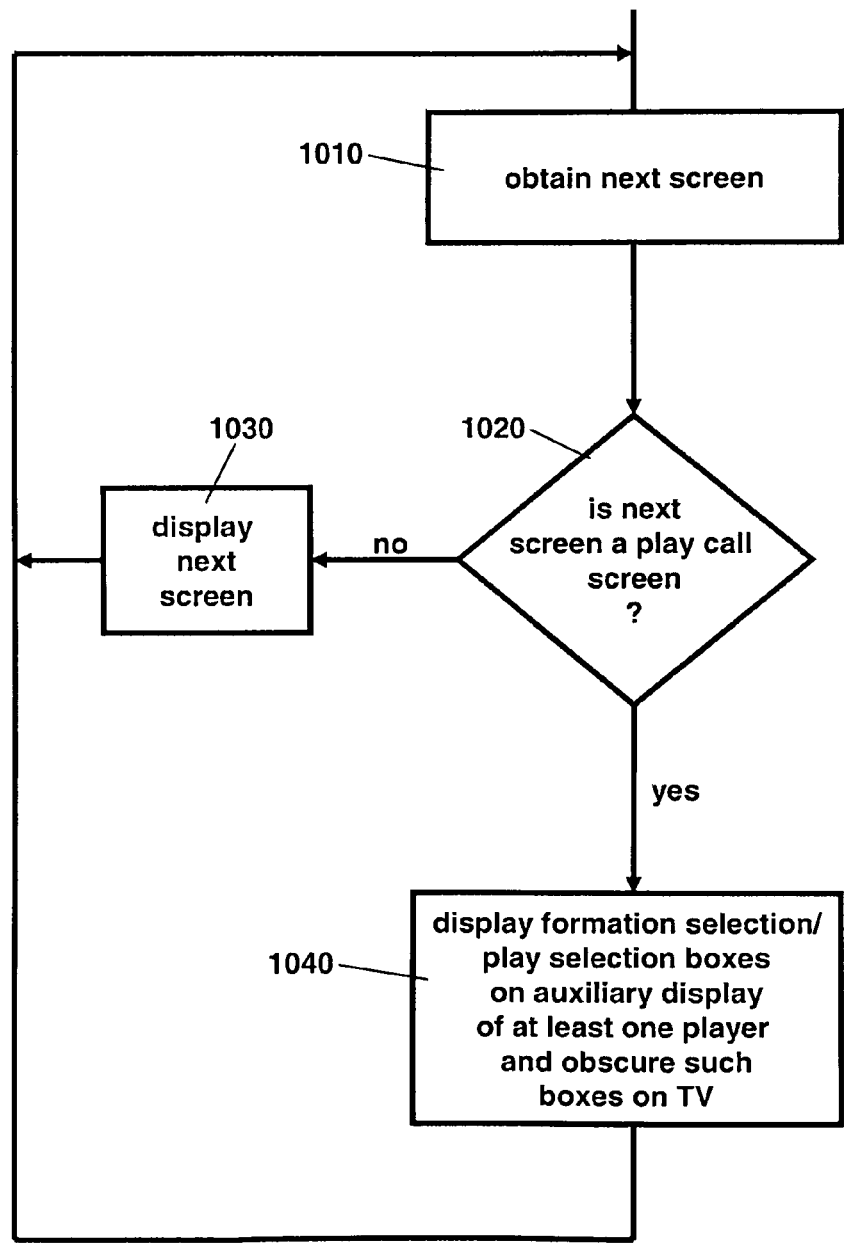

FIG. 10 is a flowchart depicting the operation of an embodiment of the invention to process the signals received from the game console so as to identify formation selection and play selection screens and send certain information on such screens to the individual player displays and not to the television. Basically, the software remains in a loop until it detects a frame that is a formation selection or play selection screen. This detection is made by obtaining successive screens at step 1010 and by comparing each screen with a known digital play call screen signature that is stored in ROM 120. If a play call screen is not detected, the screen is displayed to all at step 930. Upon detecting such a frame, offensive or defensive player formation selection and play selection boxes are removed at step 1040 from the signals being sent to the television screen 20 and provided to the auxiliary display 170.

Figure 11:
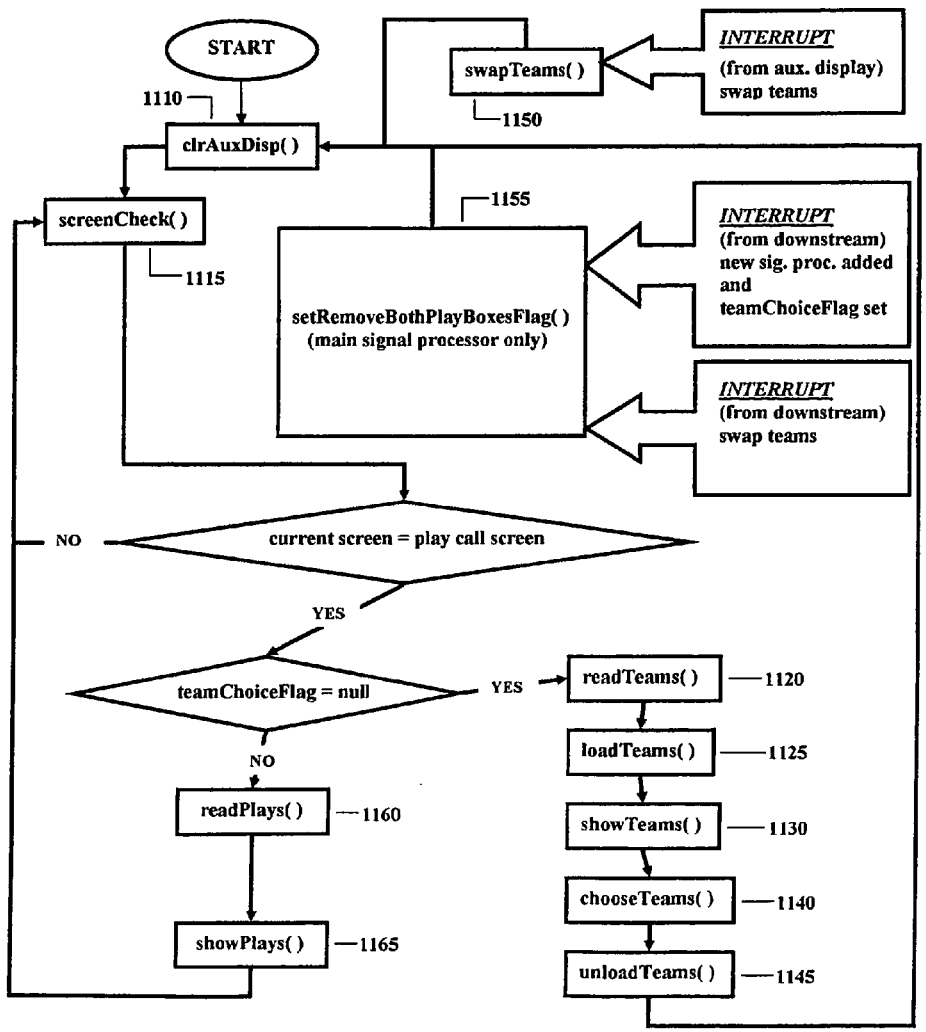
FIG. 11 is a flowchart depicting further details of one illustrative embodiment of a process of the invention.

FIG. 11 is a flowchart depicting details of the operation of a first embodiment of software that controls the signal processor 100. The software remains in a loop until it detects a frame that is a formation selection screen or a play selection screen. This detection is made by comparing the frame with a digital play call signature that is stored in ROM 120. Upon detecting a play call screen, teams are selected if they have not already been selected; and if they have been selected, offensive or defensive player formation selection or play selection boxes are removed from the signals being sent to the television screen 20 and provided to the auxiliary display 170. In this embodiment, team logos are used and the information stored in ROM 120 includes an array that associates play call screen team signatures with team helmet graphics for each team.

| key | value |
|---|---|
| play call screen team signature0 | team helmet graphic0 |
| play call screen team signature1 | team helmet graphic1 |
| . | . |
| . | . |
| . | . |
| play call screen team signature28 | team helmet graphic28 |

The information stored in ROM 120 also includes all operating system functions, all predetermined banners (e.g., PICK YOUR PLAY (FIGS. 7 and 8), client-side updating firmware, possession dot signature, common play clock signature, 10 second play clock signature, play call screen signatures and play call box signatures. The play call screen team signatures are used to identify logos 1330 in scoreboard 1390 or 1490. The possession dot signature, is used to locate possession dot 1370 on scoreboard 1390 or dot 1470 on scoreboard 1490 so as to determine which team (home or away) has the ball. The common play clock signature and the 10 second play clock signature are used to locate and read the time on play clock 1350, and the play call screen signature is used to identify the player formation selection and play selection screens, and the play call box signatures are used to identify formation selection boxes 1310 and 1320 and play selection boxes 1410 and 1420.

Illustratively, the operating system functions are screenCheck 1115, readTeams 1120, loadTeams 1125, showTeams 1130, chooseTeams 1140, unloadTeams 1145, swapTeams 1150, setRemoveBothPlayBoxesFlags 1155, clearAuxiliaryDisplay (clrAuxDisp) 1110, read Plays 1160, showPlays 1165 and sendUpstream. Details of these functions are set forth below.

| screenCheck |
|---|
| 1    read current screen from flip flops into comparator |
| 2    compare current screen to the play call screen signature |
| 3    if current screen is play call screen { |
| if teamChoiceFlag is null { |
| call readTeams function |
| } |
| else if teamChoiceFlag is not null |
| call readPlays function |
| } |
| else |
| call screenCheck function (recursive call) |

-continued readTeams 1. read away and home team logos from current screen into RAM
2. call loadTeams function loadTeams 1. compare the away and home team logos from the current screen with all of the play call screen team signatures stored in ROM
2. load the matching team helmet graphics into RAM
3. call showTeams function showTeams 1. send the matching team helmet graphics to the auxiliary display screen
2. call chooseTeams function chooseTeams 1. move team selection box left or right
2. set teamChoiceFlag (0 = home team, 1 = away team)
3. if this signal processor is not the main signal processor
   call sendUpstream function, passing this signal processor's teamChoiceFlag
4. call unloadTeams function unloadTeams 1. delete away and home team logos and helmet graphics from RAM
2. call clrAuxDisp function.

swapTeams 1. if teamChoiceFlag is not null
   toggle teamChoiceFlag
2. if this signal processor is not main signal processor
   call sendUpStream function, passing this signal processor's teamChoiceFlag
3. call clrAuxDisp function.

setRemoveBothPlayBoxesFlag-(receives the teamChoiceFlag from downstream signal processor)

1. if the main signal processor's removeBothPlayBoxesFlag is not set
   AND
   if the teamChoiceFlag from the downstream processor is different from the main processor's teamChoiceFlag,
   set the main processor's removeBothPlayBoxesFlag
2. call clrAuxDisp function.

clrAuxDisp 1. clear the auxiliary display screen
2. call screenCheck function readPlays 1. if the main processor's removeBothPlayBoxesFlag is set,
   replace both play call boxes with predetermined banners (FIG. 8)
2. if teamChoiceFlag is set to the home team and the home team has the ball
   OR
   if teamChoiceFlag is set to the away team and the away team has the ball{
   read offensive formation selection box/play selection box and common play clock into RAM
   if the main processor's removeBothPlayBoxesFlag is not set
   replace the offensive play call box with a predetermined banner (FIG. 7)
   }
   else if teamChoiceFlag is set to the home team and the away team has the ball
   OR
   if teamChoiceFlag is set to the away team and the home team has the ball{
   if 10 second play clock is not showing
   read defensive formations/plays and common play clock into RAM
   else if 10 second play clock is showing
   read defensive formations/plays and 10 second play clock into RAM
   if the main processor's removeBothPlayBoxesFlag is not set
   replace the defensive play call box with a predetermined banner
   }
3. call showPlays function showPlays 1. send the formation selection box/play selection box and play clock to auxiliary display screen
2. call screenCheck function sendUpstream send this signal processor's teamChoiceFlag to the next upstream signal processor.

As soon as signal processor 100 boots up, it loads the following into RAM 125 from ROM 120:
  all operating system functions
  all predetermined banners (if this signal processor is the main signal processor)
  the possession dot signature
  the common play clock signature
  the 10 second play clock signature
  the play call screen signature
  the play call box signature.

Throughout the running of the signal processor functions, these items will be loaded into RAM:
  play call screen away team signature
  play call screen home team signature
  away team helmet graphic
  home team helmet graphic
  teamChoiceFlag.

As will be apparent from the foregoing descriptions of the operating system functions, screen check (paragraph 0031) tests for the presence of a play call screen in the incoming video signal; readPlays (paragraph 0040) obscures the player's formation selection and play selection boxes in elements 720 of FIG. 7 and elements 810, 820 of FIG. 8; and showPlays (paragraph 0041) sends the formation selection and play selection boxes to auxiliary display 170.

Figure 12:
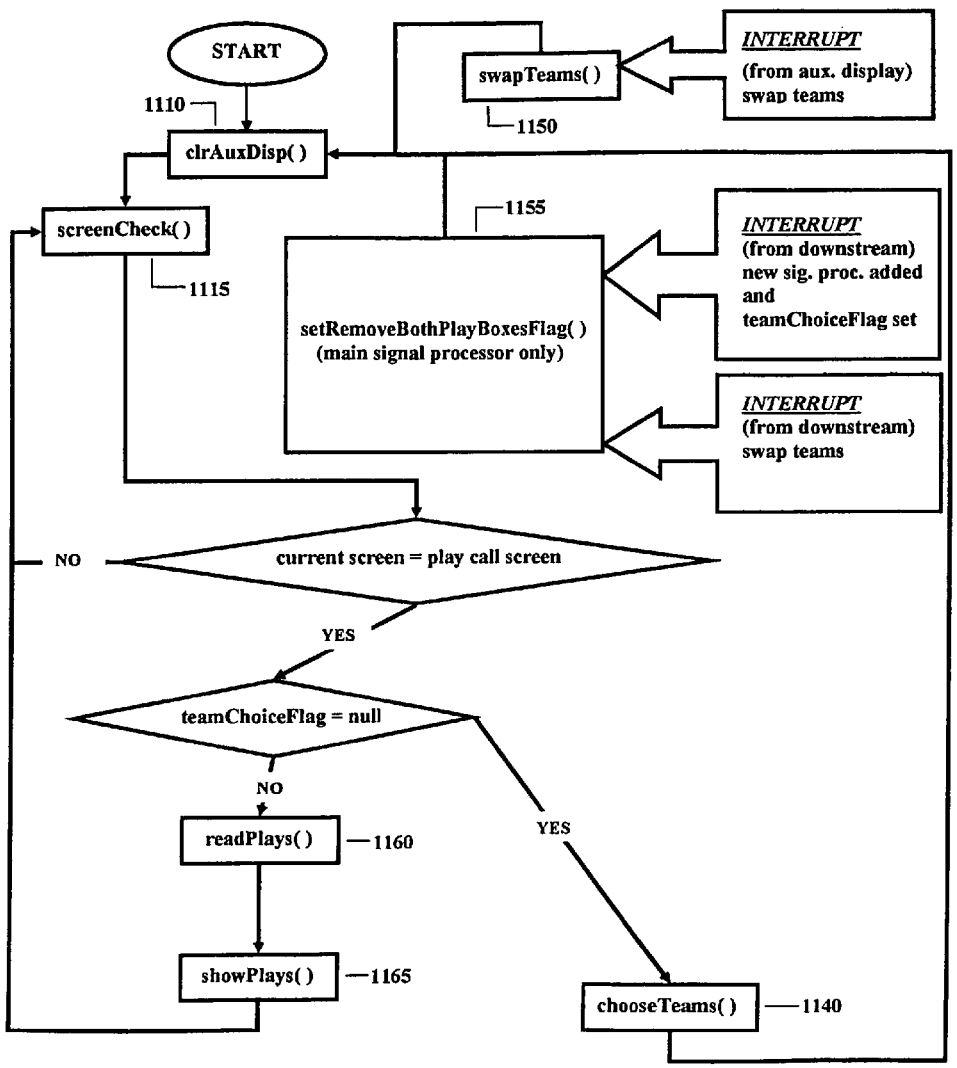
FIG. 12 is a flowchart depicting further details of another illustrative embodiment of a process of the invention.

FIG. 12 is a flowchart depicting the operation of a second embodiment of software that controls the signal processor 100. In this embodiment team logos are not used. Again, the software remains in a loop in the screenCheck function until it detects a frame that is a formation selection or play selection screen. This detection is made by comparing each screen with a known digital play call signature that is stored in ROM 120. Upon detecting a play call screen, teams are selected if they have not already been selected; and if they have been selected, offensive or defensive player formation selection or play selection boxes are detected by comparison with a play call box signature and are removed from the signals being sent to the television screen 20 and provided to the auxiliary display 170.

Most of the functions are the same as those described in connection with FIG. 11A and bear the same number. However, there are no readTeams, loadTeams, showTeams or unloadTeams functions and the function calls of screenCheck and chooseTeams are modified appropriately. The same information is stored in ROM 120 as in the embodiment of FIG. 11A except there is no array that associates play call screen team signatures with team helmet graphics.

screenCheck

| | |
|---|---|
| 1 | read current screen from flip flops into comparator |
| 2 | compare current screen to the play call screen signature |
| 3 | if current screen is play call screen { | if teamChoiceFlag is null {
}
call chooseTeams function
else if teamChoiceFlag is not null
call readPlays function
}
else
call screenCheck function (recursive call)

chooseTeams

| | |
|---|---|
| 1 | move team selection box left and right |
| 2 | set teamChoiceFlag (0 = home team, 1 = away team) |
| 3 | if this signal processor is not the main signal processor |
| | call send Upstream function, passing this signal processor's teamChoiceFlag |
| 4 | call closeAuxDisp function | swapTeams

| | |
|---|---|
| 1 | if teamChoiceFlag is not null | toggle teamChoiceFlag

| | |
|---|---|
| 2 | if this signal processor is not the main signal processor |
| | call send Upstream function, passing this signal processor's teamChoiceFlag |
| 3 | call clrAuxDisp function | setRemoveBothPlayBoxesFlag-(receives the teamChoiceFlag) from the downstream signal processor

| | |
|---|---|
| 1 | if the main signal processor's removeBothPlayBoxesFlag is not set |

AND
if the teamChoiceFlag from the downstream signal processor is different from the main processor's teamChoiceFlag
set the main processor's removeBothPlayBoxesFlag

| | |
|---|---|
| 2 | call clrAuxDisp function | clrAuxDisD

| | |
|---|---|
| 1 | clear the auxiliary display screen |
| 2 | call screenCheck function | readPlays

| | |
|---|---|
| 1 | if the main processor's removeBothPlayBoxesFlag is set | replace both play call boxes with predetermined banners (FIG. 8)

| | |
|---|---|
| 2 | if teamChoiceFlag is set to the home team and the home team has the ball |

OR
if teamChoiceFlag is set to the away team and the away team has the ball{
read offensive formations/plays and common play clock into RAM
if the main processor's removeBothPlayBoxesFlag is not set
replace the offensive play call box with a predetermined banner (FIG. 7)

```
}
else if teamChoiceFlag is set to the home team and the away team has the ball
OR
if teamChoiceFlag is set to the away team and the home team has the ball{
if 10 second play clock is not showing
read defensive formations/plays and common play clock into RAM
else if 10 second play clock is showing
read defensive formations/plays and 10 second play clock into RAM
if the main processor's removeBothPlayBoxesFlag is not set
replace the defensive play call box with a predetermined banner
}
3       call showPlays function
                           showPlays 1       send the formation selection and play selection boxes and play clock to auxiliary display
screen
2       call screenCheck function
                          sendUpstream send this signal processor's teamChoiceFlag to the next upstream signal processor.
```

As in the case of the embodiment of FIG. 11, as soon as signal processor 100 boots up, it loads the following into RAM 125 from ROM 120:
all operating system functions
all predetermined banners (if this signal processor is the main signal processor)
the possession dot signature
the common play clock signature
the 10 second play clock signature
the play call screen signature
the play call box signature.

Throughout the running of the signal processor functions, this item will be loaded into RAM:
teamChoiceFlag.

As will be apparent from the foregoing descriptions of the operating system functions, screen check (paragraph 0048) tests for the presence of a play call screen in the incoming video signal; readPlays (paragraph 0053) obscures the player's formation selection and play selection boxes in elements 720 of FIG. 7 and elements 810, 820 of FIG. 8; and showPlays (paragraph 0054) sends the formation selection and play selection boxes to auxiliary display 170.

Numerous variations may be made in the practice of the invention. While the invention has been described in the context of a system that includes an auxiliary display and a processor for each competing player, the invention may also be practiced using a single processor with multiple auxiliary displays. Further, while the invention has been described in the context of a videogame connected to a television set, other types of displays may also be used; and while the invention has been described in the context of a football videogame, the invention is not limited to such a game nor is it limited to games of any sort.

What is claimed is:

1. A method of playing a video football game between at least first and second teams that are alternately on the offense or the defense, the game involving first and second players using at least first and second displays comprising the steps of:
receiving successive frames of a video signal depicting the football game;
detecting certain frames of the successive frames that relate to formation selection or play selection in the game by recognizing first predetermined content of the frames that relate to formation selection or play selection;
determining which team is on the offense or which team is on the defense by recognizing in the frames that relate to formation selection or play selection an indication of which team is on the offense or the defense;
displaying the detected formation selection or play selection frames for the team on the offense on one of the first and second displays visible to the player whose team is on the offense and not others and displaying the detected formation selection and play selection frames for the team on the defense on the other of the first and second displays visible to the player whose team is on the defense and not others; and
displaying the frames that do not relate to formation selection or play selection so that they are visible to all players.

2. The method of claim 1 wherein the frames that relate to formation selection or play selection are detected by comparing the received frames with frames that relate to formation selection or play selection.

3. The method of claim 1 wherein the frames that relate to formation selection or play selection are detected by:
converting the received frames of the video signal from an analog signal to a digital signal; and
comparing successive frames of the digital signal with previously stored images that relate to formation selection or play selection.

4. The method of claim 1 wherein the indication of which team is on the offense or the defense is a location of a possession indicator in the frame.

5. The method of claim 4 wherein the possession indicator is detected by comparing the formation selection and play selection frames with a digital signature for the possession indicator.

6. A method of playing a video football game between first and second teams involving at least two players using at least first and second displays comprising the steps of:
receiving successive frames of a video signal depicting the football game;
detecting certain frames of the successive frames that relate to formation selection or play selection for at least one team in the game by recognizing first predetermined content of the frames that relate to formation selection or play selection;
determining which team is on the offense or which team is on the defense by recognizing a possession indicator and its location in the frames that relate to formation selection or play selection;

displaying the detected formation selection or play selection frames for the team on the offense only to the display held by the player on the offense and the formation selection and play selection frames for the team on the defense only to the display held by the player on the defense; and displaying the frames that do not relate to formation selection or play selection so that they are visible to all players.

7. The method of claim 6 wherein the frames that relate to formation selection or play selection are detected by comparing the received frames with frames that relate to formation selection or play selection.

8. The method of claim 6 wherein the frames that relate to formation selection or play selection are detected by:

converting the received frames of the video signal from an analog signal to a digital signal; and comparing successive frames of the digital signal with previously stored images that relate to formation selection or play selection.

9. The method of claim 6 wherein the possession indicator is detected by comparing the formation selection and play selection frames with a digital signature for the possession indicator.

10. A method of playing a video game between at least first and second teams that at different times are in a first mode of play and a second mode of play, the game involving at least two players wherein a first player uses a first display to play the game and a second player uses a second display to play the game comprising the steps of:

generating successive frames of a video signal depicting the video game;

detecting certain frames of the successive frames that contain first information that is to be made available to the player in the first mode of play but not the player in the second mode of play and second information that is to be made available to the player in the second mode of play but not the player in the first mode of play by recognizing first predetermined content of the certain frames;

determining which player is in the first mode of play;

displaying the first information on the display used by the player in the first mode of play;

displaying the second information on the display used by the player in the second mode of play; and displaying any remaining information on a display visible to all players.

11. The method of claim 10 wherein the first display is a small screen display visible only to the first player and the second display is a small screen display visible only to the second player.

12. The method of claim 10 further comprising the step of converting the video signal from an analog signal to a digital signal before detecting certain of the successive frames.

13. The method of claim 10 wherein the successive frames of the video signal depict a game having at least two competing players and the first information and second information are identified by comparing the successive frames with at least one stored image.

14. The method of claim 13 wherein the first information and second information are a selection of plays.

15. The method of claim 10 wherein the video game is a football game between two teams and the first information and second information relate to formation selection or play selection for one or both of the teams.

* * * * *